United States Patent [19]

Burrows

[11] Patent Number: 4,504,094
[45] Date of Patent: Mar. 12, 1985

[54] DRIVE MECHANISM FOR INVALID CARRIAGES

[75] Inventor: Donald L. Burrows, Utopia, Canada

[73] Assignee: Everest and Jennings Canadian Limited, Concord, Canada

[21] Appl. No.: 418,686

[22] Filed: Sep. 16, 1982

[51] Int. Cl.³ ............................................. B60B 5/04
[52] U.S. Cl. .............................. 301/6 R; 301/63 PW; 301/63 DS; 192/67 P; 192/95
[58] Field of Search .............. 192/67 P, 95; 301/6 R, 301/63 DD, 63 DS, 63 PW

[56] References Cited

U.S. PATENT DOCUMENTS

| 1,078,840 | 11/1913 | Druschel | 192/95 X |
| 2,619,211 | 11/1952 | Berden | 192/67 P |
| 3,251,630 | 5/1966 | Astley | 192/67 P X |

FOREIGN PATENT DOCUMENTS

| 1275899 | 8/1968 | Fed. Rep. of Germany | 301/63 PW |
| 2215552 | 10/1973 | Fed. Rep. of Germany | 192/67 P |
| 665340 | 1/1952 | United Kingdom | 192/67 P |

Primary Examiner—David A. Scherbel
Attorney, Agent, or Firm—Ridout & Maybee

[57] ABSTRACT

A drive mechanism for wheelchairs comprises a drive member and a driven wheel hub member journalled on the drive member for rotation about an axis. The drive and driven members each have axial grooves, the grooves in the drive member and the driven member being adapted to be aligned thereby to define axial keyways. A clutch member is rotatably mounted on the drive member and provides axially extending keys. The clutch is movable between an engaged position in which the keys are inserted into the keyways and a disengaged position in which the keys are removed from the keyways.

12 Claims, 4 Drawing Figures

DRIVE MECHANISM FOR INVALID CARRIAGES

FIELD OF THE INVENTION

The present invention relates to drive mechanisms for use in particular in invalid carriages which are equipped with motor drives.

BACKGROUND OF THE INVENTION

A wheelchair or other invalid carriage which is provided with an electric battery powered motor commonly includes a drive transmission mechanism, such as a gear train, which, while engaged with the driven wheel generates considerable resistance to rotation or drag while the motor is non-operational. It is highly advantageous consequently, to provide a drive mechanism which may be disengaged from the driven wheel at will to allow the wheelchair to be readily mobile while the motor is switched off.

Drive mechanisms for motorized wheelchairs, which include means for disconnecting the motor and the driven wheel have been proposed heretofore. However, the present invention offers advantages over devices which have previously been provided, as will hereinafter be explained.

SUMMARY OF THE INVENTION

A drive mechanism in accordance with the present invention comprises a drive member and a driven wheel hub member journalled on the drive member for rotation about an axis, a clutch member mounted on one of said members for rotation therewith, the drive member and the driven member each having at least one axial groove, the grooves in the drive member and the driven member being adapted to be aligned thereby to define at least one keyway, the clutch member providing at least one axially extending key and thereby being movable between an engaged position in which the key is inserted into said keyway and a disengaged position in which the key is removed from said keyway selectively to lock the driven wheel hub member to the drive member.

BRIEF DESCRIPTION OF THE DRAWINGS

In order that the invention may be readily understood, a preferred embodiment thereof will now be described by way of example with reference to the accompanying drawings, in which.

DESCRIPTION OF THE PREFERRED EMBODIMENT

Figure 1:
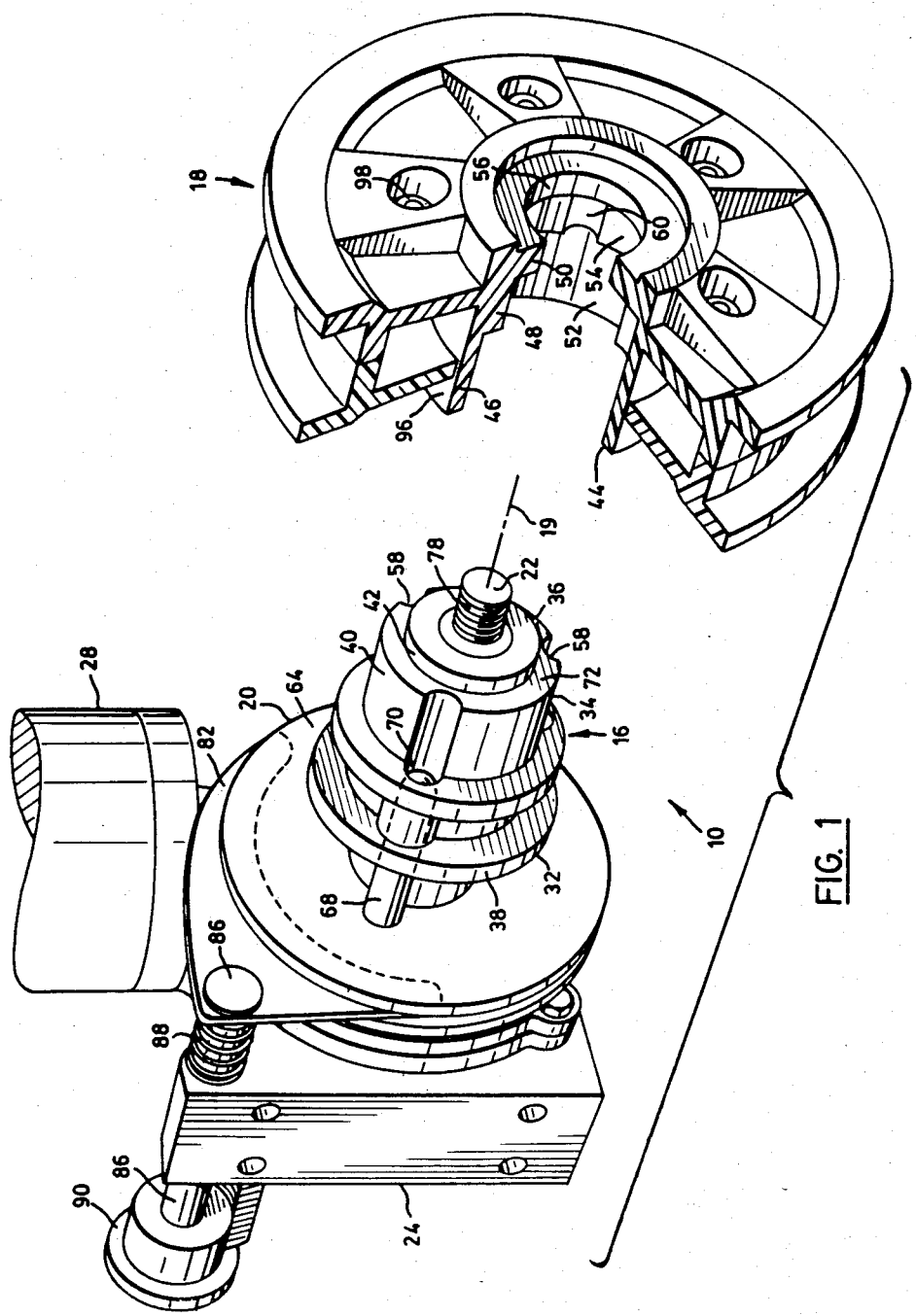
FIG. 1 is an exploded, partially cut-away isometric view of a drive mechanism in accordance with the invention.
Figure 2:
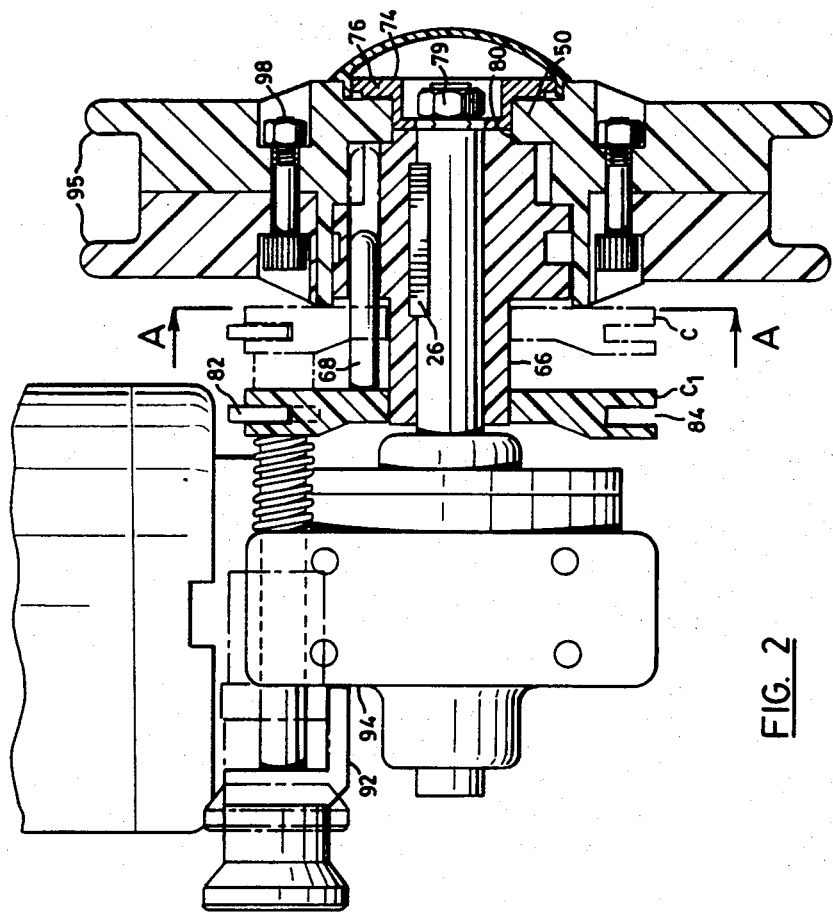
FIG. 2 is a cross-sectional side elevational view of the drive mechanism of FIG. 1.
Figure 3:
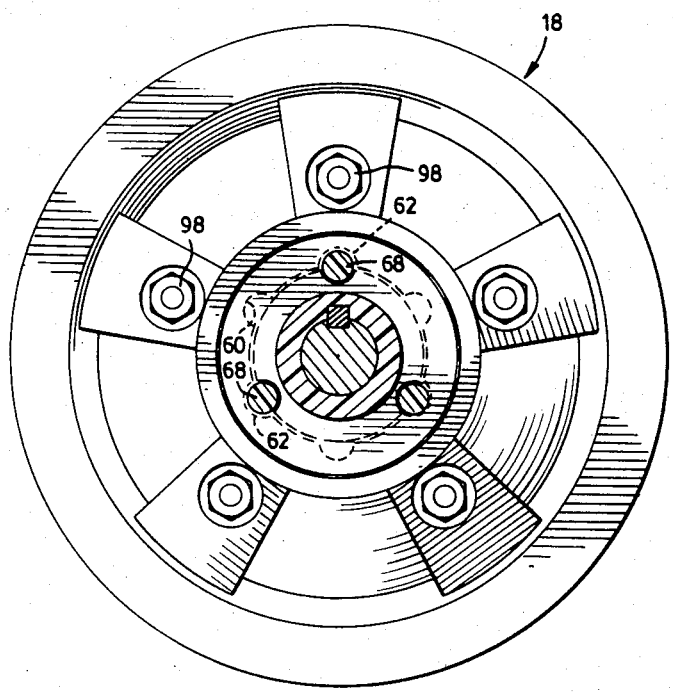
FIG. 3 is a sectioned view of part of the drive mechanism on the line A—A shown in FIG. 1.
Figure 4:
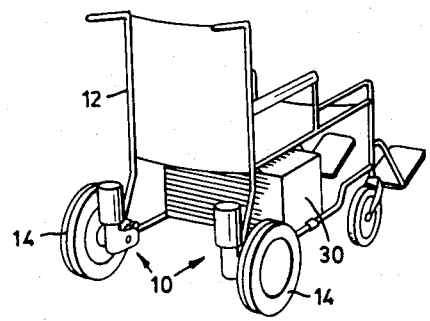
FIG. 4 is a perspective view of the drive mechanism, as mounted for use in a wheelchair.

The drive mechanism 10 illustrated in FIGS. 1 to 3 of the drawings is intended to be used, preferably in pairs on invalid carriages such as a wheelchair 12 shown in FIG. 4, and mounted therein to drive the driven rear wheels 14.

Referring to FIGS. 1 to 3, the drive mechanism 10 comprises, basically, a drive member 16, a driven wheel hub member 18 journalled on the drive member 16, for rotation about an axis 19, and a clutch member 20 which is mounted upon the drive member 16 for sliding movement axially between engaged and disengaged positions, C & $C_1$, respectively, for selectively locking the driven wheel hub member 18 to the drive member 16.

The drive member 16 is mounted upon the drive shaft 22 of a mechanical power transmission device such as reduction gear drive 24, and is positively locked to the drive shaft 22 by means of a key 26.

The drive shaft 22 is driven by a suitable electric motor 28, powered by a battery 30 (FIG. 4) mounted in the wheelchair 12.

The drive member 16 is integrally formed with first, second and third generally cylindrical portions, generally referenced 32, 34 and 36, respectively, these portions providing outer bearing surfaces, 38, 40 and 42, respectively of decreasing diameters, and concentric with the drive shaft 22.

The driven wheel hub member 18 comprises an inner hub member 44, in which the drive member 16 is received, the inner hub member providing internal first, second and third bearing portions, 46, 48, 50, respectively each having an internal cylindrical bearing surface, 52, 54 and 56, corresponding with outer cylindrical bearing surfaces 38, 40 and 42, respectively.

The second, or middle, portion of the drive member 34 is formed with three first peripheral grooves 58 extending parallel with the axis 19, and which are circumferentially spaced at equal intervals about the bearing surface 40. The corresponding second bearing portion 48 of the inner hub member 44 is formed with six second peripheral grooves 60 extending parallel with the axis 19 when the wheel hub member 18 is mounted on the drive member 16, and which are circumferentially spaced at equal intervals about the inner bearing surface 54. Upon rotation of the wheel hub member relative to the drive member 16, the corresponding axial grooves 58 and alternate grooves 60 are adapted to be aligned with one another so as to define keyways 62 therebetween. As shown in FIG. 3, these keyways 62 are preferably circular in cross-section, but may alternatively be of any other suitable cross-sectional configuration. As noted, the second bearing segment of the inner hub member has six equally spaced grooves 60, such that grooves 60 will become aligned with the corresponding grooves 58 of the drive member. In this way, the wheel must be rotated approximately 30° or less in order for corresponding grooves to become aligned. It will be understood, however, that it is equally possible to provide any other desired number of grooves 58 and/or 60, the upper and lower limits for the numbers of grooves being determined by practical considerations, namely, the need for adequate spacing between adjacent grooves to be provided so that each keyway may be so formed as to permit positive locking action to take place. There may also, for example, be provided an equal number of grooves 58 and 60 such as one groove in each of the drive member and driven member. Alternatively, the number of second grooves 60 may be an even multiple of the number of first grooves 58.

The clutch member 20 comprises an annular carrier member 64 which is slidably mounted upon an end portion 66 of the drive member 16, and three rod-like locking members or keys 68 extend axially therefrom in alignment with the first grooves 58 of the drive member 16. The keys are of diameters such that they can each be slidably inserted into a corresponding keyway 62 thereby to positively lock the wheel hub member to the drive member.

The clutch member 20 and keys 68 may be of integral fabrication and may be formed of a suitable plastics material e.g. Delrin, a Trade Mark of the Dupont Corporation, by means of injection moulding. The drive member 16, and/or the wheel hub member 18 may also be formed of this material. In this connection, it is important to note that in the locked position of the drive mechanism, shear forces are distributed lengthwise over the body of each key along substantially the full length of each key and consequently the stress induced in each key by these shear forces is minimized. This enables relatively inexpensive injection moulding techniques to be used to produce the clutch member as opposed to, for example, steel fabrication. Steel or other relatively durable materials would be required when shear forces act transversely across the relatively thin key, since most plastic materials in common use lack sufficient strength to withstand such forces.

The keys 68 extend through bores 70 formed in the first portion 32 of the drive member and below the bearing surface 38. These bores 70 are in alignment with the grooves 58 and thereby cause the clutch member to rotate together with the drive member, while acting as guides to guide the keys into the keyways so as to retain them in proper alignment at all times in rotation with the drive member 16.

When in the disengaged condition, the wheel hub member 18 is freely rotatable about the drive member 16, frictional contact being provided primarily by corresponding first and third bearing surfaces 38, 52, and 42, 56, respectively.

Since the diameter of the third drive member portion 36 is smaller than that of the adjacent segment 34, an end wall 72 is formed, against which the third bearing portion 50 abuts. A retainer 74 providing an outer flanged portion 76 is mounted upon a threaded end 78 of the drive shaft 22 and is held thereon by a nut 79. An annular groove 80 is thus formed between the drive member and retainer in which the wheel hub member is rotatably retained via the third bearing portion 50.

A semi-circular actuator member 82 is mounted in an annular peripheral groove 84 formed in the carrier member 64, the carrier member being rotatable, while the actuator member is non-rotatable. A shift rod 86 is rigidly attached to the actuator member and extends through a bore suitably formed in the transmission housing 24, for sliding movement in the axial direction of the rod, whereby the actuator member, in engagement with the carrier member causes the latter to be slidably moved along the end portion of the drive member in response to axial movement of the rod 86, thereby to move the keys into and out of the keyways at will.

A compression spring 88 mounted on the rod 86 between the actuator member 82 and the transmission housing 24 biases the actuator member 82 in a direction to engage the drive member and wheel hub member. A knob 90 provided on the end of the rod 86 provides means to manually slide the rod 86 along its length. The knob is rotatable about the rod 86 and is formed with an integral engagement member 92, the latter being adapted to abut against the outer wall 94 of the transmission housing and thereby to hold the clutch member in the disengaged position $C_1$ against the force of compression spring 88.

The wheel hub member 18 comprises first and second wheel hub parts, one of the parts being integrally formed with the inner hub member 44, while the other of the parts is slidably mounted upon the cylindrical outer surface 96 of the inner wheel hub member. The first and second wheel hub parts being interconnected by means of nut and bolt assemblies 98. The assembled wheel hub member 18 provides a peripheral rim 95 for mounting a tire thereon for movement on a surface. The rim may be suitably formed to accept tires of various types and sizes as may be required.

In operation, the drive mechanism 10 is mounted in a wheelchair 12, preferably in a pair in the rear portion of the wheelchair frame, each mechanism 10 of said pair thus being adapted to drive a corresponding rear driven wheel 14. Normally, each mechanism 10 is mounted with the wheel 14 extending outwardly at each side of the wheelchair frame. However, this positioning may be reversed so that the drive mechanism 10 is the outermost component. In this way the knob 90 is more easily accessible to a person seated in the wheelchair. If desired, a cable operable control device can be provided so as to enable the clutch member 20 to be remotely operated, for example, by a lever or other manually operable device positioned on the wheelchair within easy reach of the person seated therein.

When the knob 90 is pulled outwardly and rotated so as to cause the engagement member 92 to abut against wall 94 of the transmission housing, the keys 68 are removed from the keyways 62 and the wheel 14 is freely rotatable about the drive member 16. The drive motor 28 would normally be non-operational at this time, and free movement of the wheelchair over a surface would not be impaired by drag or resistance in the drive mechanism, except for normal resistance due to frictional forces, such as between the wheel and the drive member.

To engage the wheel 14 and the drive mechanism, it is simply required to rotate the knob 90 until the engagement member 92 no longer abuts against wall 94. Then the rod 86, together with the actuator member 82 are forced by the compression spring 88 towards the engaged position C. However, the keys cannot be inserted into the keyways 62 until the corresponding grooves 58 and 60 are in alignment. It may therefore be required to rotate the wheels slightly by moving the wheelchair along the ground. When the grooves are in alignment the keys will enter the keyways due to the constant biasing force placed upon the clutch member by the spring. Thus, engagement and disengagement of the wheel 14 and the drive mechanism can easily be accomplished either while the wheelchair is occupied or unoccupied.

I claim:

1. A selective drive mechanism for use in a powered invalid carriage, comprising:
    a drive member and a driven wheel hub member journalled thereon for rotation about a common axis,
    said members providing respective cooperating cylindrical bearing surfaces each having at least one axial groove, the wheel hub member being rotatable on the drive member for bringing the grooves of said members into alignment thereby to define at least one axially extending keyway,
    a clutch member providing at least one axially extending key, said clutch member being movable axially between an engaged position in which the key extends along said keyway and a disengaged position in which the key is withdrawn from the keyway, and means for selectively moving the clutch between its engaged and disengaged positions for selectively locking the driven wheel hub member to the drive member for rotation therewith and unlocking the driven wheel hub member from the driven member for independent rotation thereon.

2. The drive mechanism of claim 1, wherein the clutch member comprises an annular carrier member mounted for sliding axial movement upon the drive member, said at least one key extending axially therefrom in alignment with said at least one groove in said drive member.

3. The drive mechanism of claim 2, wherein said annular carrier member has a peripheral annular recess formed therein, a non-rotatable actuator member being disposed within said annular recess, and a shift rod being attached to said actuator member and mounted for sliding movement along its axis for said axial movement of the carrier member on the drive member.

4. The drive mechanism of claim 3, wherein a compression spring is provided on said shift rod for biasing said clutch member towards said engaged position thereof.

5. The drive mechanism of claim 1 further comprising means for biasing said clutch member towards said engaged position thereof.

6. The drive mechanism of claim 1, wherein the clutch member and said at least one key are integrally formed of synthetic plastics material.

7. The drive mechanism of claim 6, wherein said synthetic plastics material comprises a mouldable plastic resin material.

8. The drive mechanism of claim 1, wherein said wheel hub member comprises first and second wheel hub parts interconnected for mounting a tire peripherally thereon.

9. The drive mechanism of claim 8, wherein each of said wheel hub parts is integrally formed of synthetic plastic materials.

10. The drive mechanism of claim 1, wherein the drive member, the driven wheel hub member and the clutch member are formed of synthetic plastic materials.

11. A selective drive mechanism for use in a powered invalid carriage, comprising:
a drive member and a driven wheel hub member journalled thereon for rotation about a common axis, the drive member providing an outer cylindrical bearing surface having a first plurality of axial grooves spaced circumferentially at equal intervals therearound, the driven wheel hub member comprising first and second hub parts, the first hub part providing an inner cylindrical bearing surface having a second plurality of axial grooves spaced circumferentially at equal intervals therearound, and the driven wheel hub member being rotatable on the drive member for bringing the grooves of said members selectively in pairs into alignment thereby to define a plurality of axially extending keyways, a clutch member comprising an annular carrier slidably mounted on the drive member and having a plurality of keys extending axially therefrom engageable in said keyways, the clutch member being movable between an engaged position in which the keys extend along respective ones of said keyways and a disengaged position in which the keys are withdrawn from the keyways, and means for selectively moving the clutch member between its engaged and disengaged positions for selectively locking the wheel hub member to the drive member for rotation therewith and unlocking the wheel hub member from the drive member for independent rotation thereon.

12. The drive mechanism of claim 11, wherein the number of grooves in said second plurality of grooves is an even multiple of the number of grooves in said first plurality of grooves.

* * * * *